Figure 1:
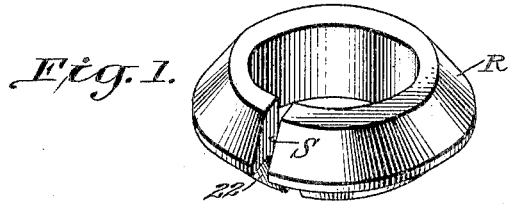

May 1, 1923.  W. E. GOSSLING  1,453,791

POST AND COVER CLAMP AND SEAL

Filed July 30, 1920

Inventor:
Walter E. Gossling,
by Byrnes, Townsend & Bichenstein,
Attorneys.

Patented May 1, 1923.

1,453,791

UNITED STATES PATENT OFFICE.

WALTER E. GOSSLING, OF NEW YORK, ASSIGNOR, BY MESNE ASSIGNMENTS, TO THE PREST-O-LITE CO., INC., OF INDIANAPOLIS, INDIANA, A CORPORATION OF NEW YORK.

POST AND COVER CLAMP AND SEAL.

Application filed July 30, 1920. Serial No. 400,012.

*To all whom it may concern:*

Be it known that I, WALTER E. GOSSLING, a citizen of the United States, residing at New York, in the county of New York and State of New York, have invented certain new and useful Improvements in Post and Cover Clamps and Seals, of which the following is a specification.

This invention relates to an improved post and cover clamp and seal that is especially adapted for retaining a storage battery terminal post in place in an opening in the cell cover and for sealing the joint between such post and opening. The broad principles of the invention may, however, be employed in retaining and sealing a similar rod-like member in an opening in a similar plate-like member.

In storage batteries of the type employing terminal posts projecting through openings in the cell covers, it is necessary to securely retain the terminal post in its opening and also to provide means for sealing all joints to prevent leakage and evaporation of the acid electrolyte. Accordingly, the principal object of this invention is to provide a simple and efficient means whereby a terminal post may be securely held in place and sealed in an opening in a cell cover. Another object of the invention is to provide a terminal post retaining and sealing means of the above character which will permit the disconnection of the post and cover for the purpose of repairing or replacing parts.

Various methods have heretofore been employed for sealing a storage battery terminal post in the opening in the cell cover, but in certain instances the securing and sealing means are complicated and in other instances they do not provide a satisfactory seal or may not be disassembled for repairing or replacing parts.

Generally speaking, I attain the above and other desirable objects of my invention by forming the cooperative parts of the terminal post and cell cover of a taper fit and providing a ring, desirable a one-piece split ring, to clamp such post and cover in sealing position and to interlock such parts against relative separating movement axially of the post.

The above and other objects and the novel features of this invention will be apparent from the following description taken in connection with the drawing, in which—

Figure 2:
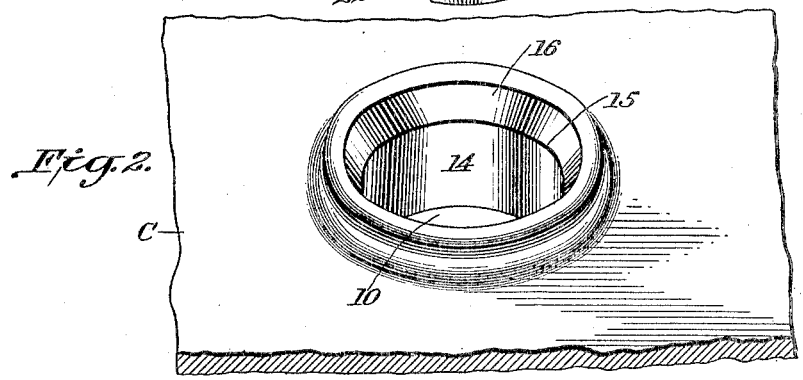
Figure 3:
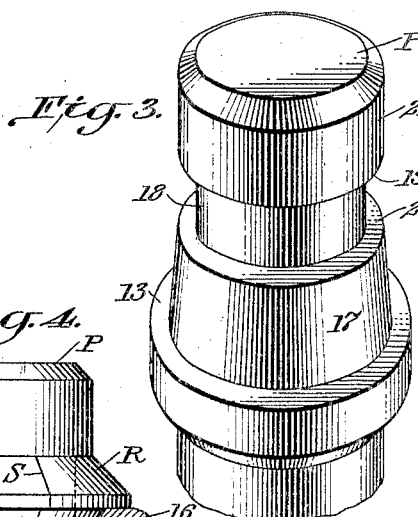
Figure 5:
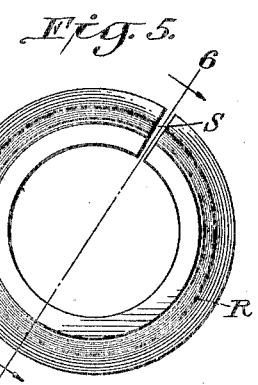
Figure 4:
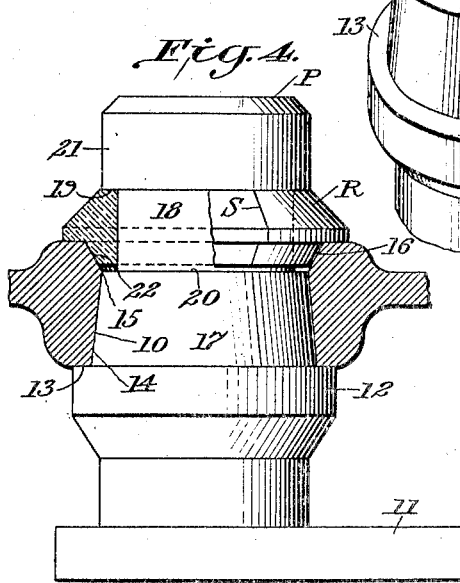
Figure 6:

Figs. 1, 2 and 3 are separate perspective views respectively, of a split ring, a portion of a cell cover plate and a storage battery terminal post arranged for assembling in connected and sealing relation, in accordance with the present invention, Fig. 4 is a cross-sectional view of a portion of a storage battery cell illustrating a cover and post clamp and seal embodying this invention, and Figs. 5 and 6 are, respectively, a plan view and an edge view, partly in section on the line 6—6 of Fig. 5, illustrating a split clamping and sealing ring employed in carrying out the present invention.

Referring to the drawing, the usual or preferred type of jar of a storage battery cell, adapted to contain the elements of the battery, such as the positive and negative plates and separators and the electrolyte, is provided with a suitable cover C adapted to close the upper end of the jar to prevent the leakage and evaporation of electrolyte therefrom and to exclude foreign matter from the interior of the cell. Both the battery jar (not shown) and the cell cover C may be made of suitable non-corrodible comparatively rigid, but elastic material such as hard rubber, and the cover C is provided with openings, such as the opening 10 through which the terminal posts of the battery, such as the post P, project from the inside of the battery to the outside to connect the positive and negative plates to the external circuit of the battery. As herein illustrated, the portion of the cover C adjacent the opening 10 is thickened to provide suitable retaining and sealing surfaces for engagement with the terminal post, but it will be understood that the entire cover may be formed of the thickness desired at the opening 10.

The terminal post P is of suitable lead alloy or other non-corrodible metal and has the usual plate strap 11, at its inner end. Above the plate strap 11 the terminal post P is provided with an enlargement or collar 12 forming a shoulder 13 that abuts against the inner side of the cover C adjacent the inner end of the opening 10, when the parts are clamped together.

The terminal post P may be clamped in sealing relation with the cover C and interlocked against relative separating movement by any suitable means. I have herein illustrated a simple and efficient means for so interlocking said post and cover as to prevent their relative separating movement and at the same time maintaining such post and cover in sealed relation with one another. In the arrangement illustrated the opening 10 in the cover is desirably provided with a tapering socket 14 that flares downwardly from a section 15 adjacent the upper end of the opening at the lower end of a downwardly inclined or tapering seat 16, which latter is formed at the upper end of the opening 10. The tapering socket portion 14 is adapted to receive a similarly tapering portion 17 of the terminal post P and to effect a sealing engagement therewith. Above the tapering portion 17, the terminal post P has a groove 18 that faces the tapering seat 16 in the cover, such groove having upper and lower walls 19 and 20 disposed above and below said seat 16 and arranged in planes substantially perpendicular to the axis of the post to form abrupt shoulders, the wall 19 constituting a locking shoulder for interlocking with the upper edge of a clamping ring R, to be described. The head portion 21 of the terminal post P above the shoulder 19 is of a diameter that will readily pass through the smallest part of the opening 10 and is adapted to have the connector of the external circuit attached thereto.

The securing or clamping ring R by means of which the terminal post P is interlocked with the cover C against relative separating movement therefrom and clamped in sealing relation thereto, may be of any suitable form that will obtain the desired results and I have herein disclosed a desirable construction in which the ring consists of suitable flexible or yieldable non-corrodible material such as antimony-lead alloy, the ring being formed in one piece and split transversely as at S to provide ends which are separable so that it will readily pass over the head portion 21 of the terminal post, such ends being closable together when the ring is in place. The ring is provided adjacent its lower outer edge with an inclined or camming face 22 adapted to engage and cooperate with the seat 16 of the cover to contract or force the ring inwardly into the groove 18 as it is forced downwardly axially of the terminal post. When the ring has been pushed down sufficiently far so that its upper edge passes below the shoulder 19 of the groove, the cooperating tension in the cover and split formation of the ring will cause the ring to spring into place into the groove 18 with the inner wall of the ring abutting against the bottom of the groove and ends at the split or gap S disposed close together or closed. At the same time, the shoulder 13 is drawn into abutting relation to the lower side of the cover and the tapering portion 17 is drawn into the socket 14 of the opening 10, thereby effectively sealing the assemblage. Axial pressure on the ring R to secure it in place may be applied by any suitable means. When it is desired to disassemble the parts for any reason, the ring R may be readily withdrawn from its interlocking relation and the post withdrawn from the opening 10. The terminal post P and parts cooperating therewith may be of rectangular or other section than the circular section herein disclosed.

While I have shown and described the invention in detail, it is to be understood that various modifications may be made therein without departing from the spirit of the invention or sacrificing any of the advantages thereof, and therefore I do not wish to be limited to the exact structure disclosed.

I claim:

1. A post and cover clamp and seal for storage batteries comprising, in combination, a cell cover having an opening therethrough, a storage battery terminal post extending through said opening and having an integral shoulder thereon above the upper side of said cover, and securing means bearing against the upper side of said cover and against said shoulder and interlocking said post and said cover against separating movement and clamping them in sealing relation with one another.

2. A post and cover clamp and seal comprising, in combination, a cell cover having an opening therethrough, a storage battery terminal post disposed in said opening, and a split metal ring interlocking said post and cover against relative separating movement and clamping such parts in sealing relation with one another.

3. A post and cover clamp and seal comprising, in combination, a cell cover having an opening therethrough, a storage battery terminal post disposed in said opening, and a ring clamping said post and cover in sealing relation, said ring and cover having cooperating beveled surfaces.

4. A post and cover clamp and seal comprising, in combination, a cell cover having a tapering opening therein, a storage battery terminal post having a tapering portion fitting said tapering opening, and a split ring clamping said post in said opening.

5. A post and cover clamp and seal comprising, in combination, a cell cover having an opening provided with a tapering seat adjacent the upper end thereof and a tapering socket, a storage battery terminal post having a tapering portion fitting said tapering socket and a groove facing said tapering seat, and a contractile ring cooperating with said tapering seat, fitting said groove and clamping said parts together in sealing relation.

6. A post and cover clamp and seal comprising, in combination, a cell cover having an opening provided with a tapering seat adjacent the upper end thereof, a storage battery terminal post projecting through said opening and having a groove facing said tapering seat, and a contractile metal ring cooperating with said tapering seat and adapted to be forced inwardly thereby into said groove, said groove having an upper wall that is adapted to interlock with said ring to retain said parts against relative separating movement.

7. The invention claimed in claim 5, in which said post has a collar that abuts against the lower or inner side of said cover, and the upper wall of said groove is substantially perpendicular to the axis of said post, and said ring is split transversely at one point and has a beveled lower outer face that cooperates with said tapering seat to contract the ring into said groove.

8. The method of securing and sealing a terminal post or similar rod-like member in an opening in a cell cover or similar plate-like member that comprises inserting said post in said opening and contracting a ring into interlocking relation with said post and cover and simultaneously forcing such parts into sealing relation with one another.

9. The method of securing and sealing a storage battery terminal post having a locking groove into a cell cover having an opening provided with a tapering seat at the upper end thereof which comprises assembling said post in said opening so that said groove shall be disposed opposite said seat, and contracting into locking engagement with said groove a ring having a tapering surface cooperating with said seat, whereby said post and cover are interlocked against relative axial displacement and such parts are simultaneously forced into sealing relation with one another.

10. A post and cover clamp and seal for storage batteries comprising, in combination, a cell cover having an opening therethrough, a storage battery terminal post extending through said opening and having means bearing against the inner side of said cover, said post also having a circumferential groove therein facing the upper end of said opening and providing an abrupt integral shoulder on said post above the upper side of said cover, and a ring extending into said groove and bearing against the upper side of said cover and against said shoulder and interlocking said post and said cover against separating movement and clamping them in sealing relation with one another.

11. A post and cover clamp and seal for storage batteries comprising, in combination, a cell cover having an opening therethrough provided with a tapering seat at the outer end thereof, a storage battery terminal post extending through said opening and having a shoulder thereon above the upper side of said cover, and securing means cooperating with and bearing against said tapering seat and against said shoulder and interlocking said post and cover against separation and clamping them together in sealing relation.

In testimony whereof, I affix my signature.

WALTER E. GOSSLING.